United States Patent
Zimmerman

(10) Patent No.: US 9,920,765 B2
(45) Date of Patent: Mar. 20, 2018

(54) SYSTEM AND METHOD FOR FLUID LEVEL SENSING AND CONTROL

(71) Applicant: Charles Wayne Zimmerman, Redondo Beach, CA (US)

(72) Inventor: Charles Wayne Zimmerman, Redondo Beach, CA (US)

(*) Notice: Subject to any disclaimer, the term of this patent is extended or adjusted under 35 U.S.C. 154(b) by 967 days.

(21) Appl. No.: 13/750,508

(22) Filed: Jan. 25, 2013

(65) Prior Publication Data

US 2014/0212264 A1    Jul. 31, 2014

(51) Int. Cl.

| | |
|---|---|
| F04D 15/00 | (2006.01) |
| F04D 13/10 | (2006.01) |
| F04D 15/02 | (2006.01) |
| E21B 47/00 | (2012.01) |
| H01H 53/10 | (2006.01) |
| G01F 23/24 | (2006.01) |

(52) U.S. Cl.
CPC .......... *F04D 13/10* (2013.01); *E21B 47/0007* (2013.01); *F04D 15/0066* (2013.01); *F04D 15/0227* (2013.01); *G01F 23/24* (2013.01); *H01H 53/10* (2013.01)

(58) Field of Classification Search
CPC .. F04D 13/10; F04D 15/0218; F04D 15/0027; G01F 23/24–23/244; H01H 53/10; H01H 83/144; H01H 2071/165; H01H 2239/024
USPC ..... 417/36, 44.11, 423.43; 340/853.1, 854.1, 340/855.7; 335/159, 163; 73/304 R
See application file for complete search history.

(56) References Cited

U.S. PATENT DOCUMENTS

| | | | |
|---|---|---|---|
| 3,284,669 A | | 11/1966 | Boyd |
| 3,340,500 A | | 9/1967 | Boyd et al. |
| 3,426,740 A | * | 2/1969 | Hufton ..................... F02P 7/03 123/146.5 A |
| 3,683,347 A | * | 8/1972 | Melone ............... G01F 23/2921 327/530 |
| 3,936,231 A | | 2/1976 | Douglas |
| 3,965,983 A | | 6/1976 | Watson |
| 4,570,718 A | | 2/1986 | Adams, Jr. |
| 4,747,451 A | | 5/1988 | Adams, Jr. et al. |
| 4,988,975 A | | 1/1991 | Nap |
| 5,094,102 A | | 3/1992 | Fryer et al. |
| 5,213,159 A | * | 5/1993 | Schneider ............... E21B 34/14 166/250.07 |
| 5,237,857 A | | 8/1993 | Dobson et al. |

(Continued)

OTHER PUBLICATIONS

Liquid Level Sensor, SEN-10221 RoHS Compliant, https://www.sparkfun.com/products/10221, Dec. 5, 2012.

(Continued)

*Primary Examiner* — Devon Kramer
*Assistant Examiner* — Connor Tremarche
(74) *Attorney, Agent, or Firm* — Brooks Kushman P.C.

(57) ABSTRACT

A system and method for sensing level of a fluid associated with a submersible pump having an impeller driven by an associated motor include a fluid level sensor having a probe with a plurality of discrete resistive elements each having an associated contact pair substantially evenly spaced along a length of the probe and an associated switch powered by an induced voltage or current generated by power provided to the submersible pump motor and activated by the fluid conducting across the contact pair to shunt the associated discrete resistive element.

21 Claims, 4 Drawing Sheets

(56) References Cited

U.S. PATENT DOCUMENTS

| | | | |
|---|---|---|---|
| 6,499,961 B1 * | 12/2002 | Wyatt et al. .................... 417/36 |
| 6,587,054 B2 * | 7/2003 | Besser .................. H01B 7/046 |
| | | | 166/66.4 |
| 6,987,386 B1 | 1/2006 | Vail, III |
| 7,021,137 B1 * | 4/2006 | Milone ................ E21B 47/042 |
| | | | 73/304 R |
| 7,208,855 B1 * | 4/2007 | Floyd .................. E21B 43/128 |
| | | | 166/66.4 |
| 7,246,662 B2 * | 7/2007 | Jabusch ............... E21B 43/006 |
| | | | 166/105 |
| 7,258,164 B2 | 8/2007 | Rezgui |
| 7,396,216 B2 * | 7/2008 | Blauch ................ E21B 17/206 |
| | | | 166/369 |
| 7,735,555 B2 * | 6/2010 | Patel ..................... E21B 43/14 |
| | | | 166/227 |
| 7,775,275 B2 * | 8/2010 | Patel ..................... E21B 17/028 |
| | | | 166/105 |
| 7,896,079 B2 * | 3/2011 | Dyer ..................... E21B 43/14 |
| | | | 166/105 |
| 8,235,111 B2 | 8/2012 | Fink |
| 2009/0058412 A1 * | 3/2009 | Taylor et al. ................. 324/252 |
| 2009/0142207 A1 * | 6/2009 | Ring ..................... F04B 47/06 |
| | | | 417/410.1 |
| 2011/0081256 A1 | 4/2011 | Thompson et al. |

OTHER PUBLICATIONS

Hambrice, Kevin and Hooper, Henry, A Dozen Ways to Measure Fluid Level and How They Work/Sensors, K-TEK Corp, Dec. 1, 2004.

eTape, Continuous Fluid Level Sensor, Operating Instructions and Application Notes, Milone Technologies, www.milonetech.com.

Gabay, Jon, Electronic Products, Liquid Level Sensing is Key Technology for Today's Systems—Part 1, Sensor Solutions, http://www.digikey.com/us/en/techzone/sensors/resources/articles/liquid-level-sensing-html, Dec. 5, 2012.

* cited by examiner

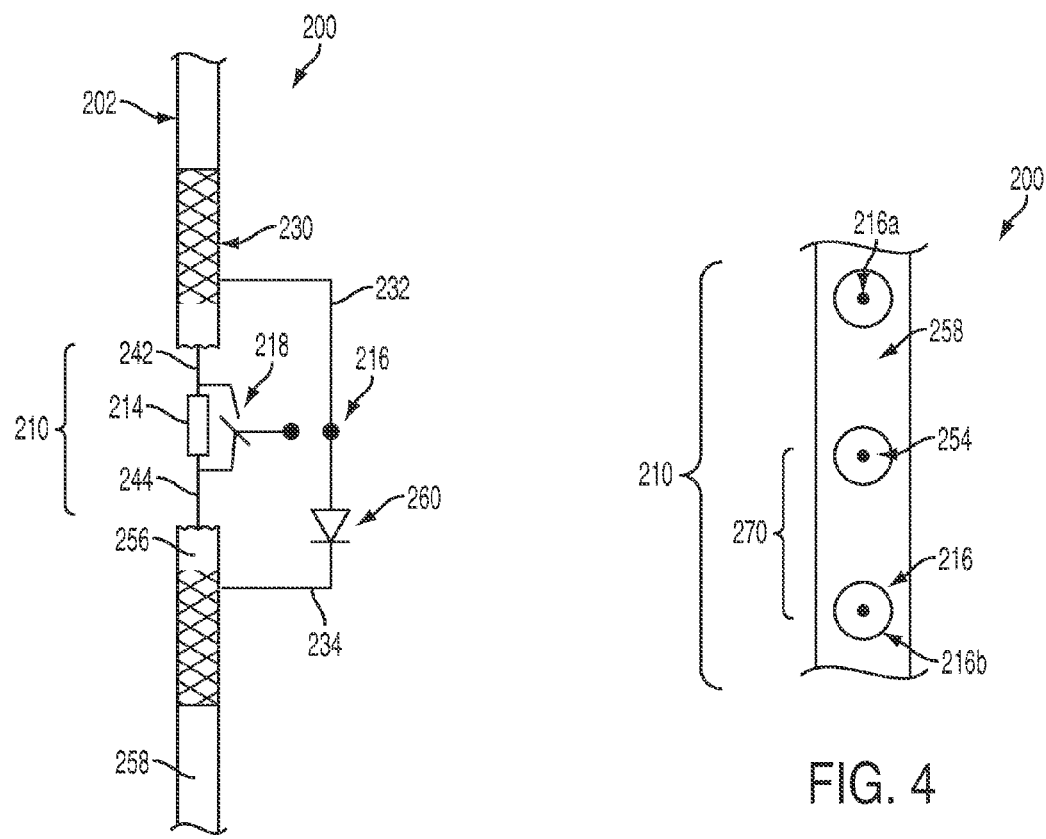
FIG. 3
FIG. 4
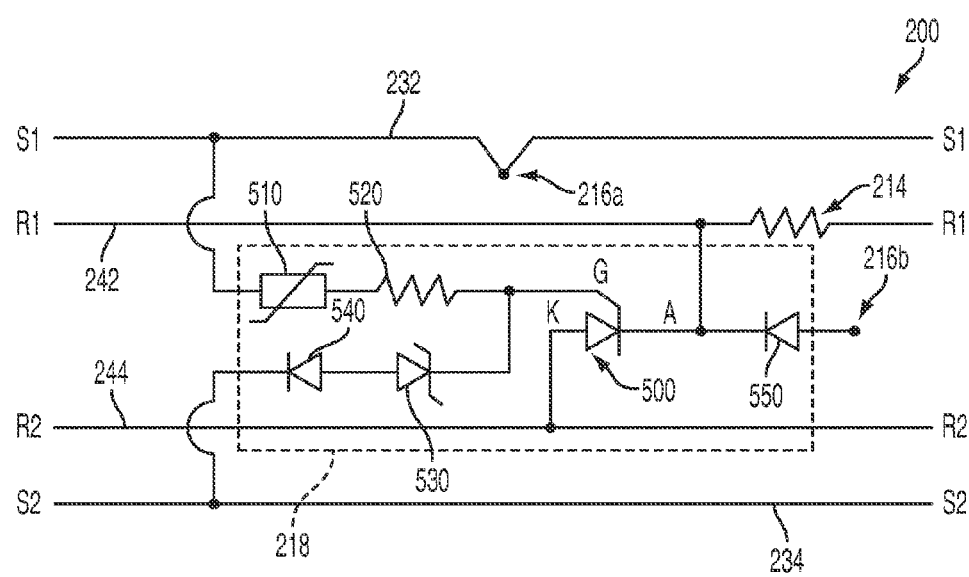
FIG. 5

SYSTEM AND METHOD FOR FLUID LEVEL SENSING AND CONTROL

TECHNICAL FIELD

The present disclosure relates to systems and methods for sensing the level of fluid within a container or geological formation, such as a tank or a well.

BACKGROUND

A variety of diverse pumping applications use a submersible pump to pump fluid from a container or geological formation. Examples include pumps for well water and sump pumps as well as pumps used in various commercial applications, such as those used in hydrocarbon or oil wells. These pumps may include a manual or automatic switch or sensor to activate the pump to remove fluid from a man-made or naturally formed container, depression, tank, well, formation, etc. Automatic operation of one or more pumps may be based on the level of fluid to control the level of fluid within a desired range. For example, a float switch may be used to automatically activate a pump when fluid level rises above a designated high level, and deactivate the pump when fluid level is below a designated low level. Other sensors may be used to control pump operation based on pressure, temperature, acoustic or optical depth detection, etc. depending on the particular application.

Many submersible pumps are powered by a closely coupled motor that powers the pump and may rely on the fluid to cool the motor during operation. As such, the motor can be damaged if the pump is operated without sufficient fluid for cooling, sometimes referred to as operating dry. In addition, low fluid levels may adversely impact pumping performance if air is entrained within the fluid (cavitation) and could also damage pump components. Submersible pumps are often difficult to service and/or replace as they are often deployed in relatively inaccessible locations. In addition, inoperative pumps may result in costly delays in commercial applications, or related damage if the fluid floods surrounding areas of the container/well. As such, it is desirable to have a reliable device to detect the fluid level, which may then be used to control pump/motor operation.

Submersible pumps and related equipment used in oil wells and similar applications may have relatively unique requirements associated with the significant depths of the wells, the characteristics of the fluid (such as viscosity, contaminants or sediment, volatility, combustibility, etc.), and the potential cost associated with repairing or replacing an inoperative pump/motor. As described above, the fluid level in a container or well may be important for at least two reasons. First, many submersible pumps provide cooling by forcing the fluid being pumped around the motor windings to cool the motor. Insufficient fluid flow or level may cause the motor temperature to rise resulting in a thermal overload condition and possibly permanent damage of the motor or pump components. For oil well applications, the fluid is generally a mixture of hydrocarbons including oil, in addition to water and sediment. Because oil is lighter or less dense than water, it is generally desirable to lower the fluid level in an oil well to extract as much oil as possible. The higher the fluid level in an oil well, the more water that will be present in the cut of crude oil.

There are a number of commercially available optical, electromagnetic, and acoustic or echo devices that are currently being used to measure fluid level in a well. However, these devices are essentially stand-alone devices that are not integrated into the pump/motor control system and require manual measurements. This takes time out of a production facility operator's schedule and reduces productivity of the well, with associated opportunity cost to the well owner. In addition, the desired fluid level for a particular well may change over time as the source is depleted. Once the desired fluid level for a well is determined, periodic checks are performed to maintain the productivity of the well.

Existing strategies for maintaining a desired fluid level within the well include selecting the pump capacity based on the observed output of the well using periodic manual measurements, or using a variable speed drive (VSD). A VSD changes motor speed and consequently the flow from the pump. A VSD allows a well operator to adjust the motor speed and pump flow as the well productivity changes over time, which may be due to source depletion or the geologic zone closing or becoming clogged over time, for example. Many attempts to regulate a VSD to control fluid level in oil well applications have failed due to various application-specific factors. One approach having limited success uses a pressure transducer at the pump to measure fluid pressure at the inlet, with higher pressure corresponding to more fluid above the pump. However, pressure often changes from zone to zone and at different depths, which requires an operator with sufficient experience to adjust the VSD accordingly. Currently available pressure transducers also have limited life, likely due to the harsh operating environment, and often fail long before a submersible pump motor such that an alternative method (usually manual) must be used to control the fluid level for the remaining life of the submersible pump/motor.

SUMMARY

A system or method for sensing fluid level include a probe having a first insulated conductor with a resistance that varies as a function of distance within at least a sensing region of the probe and a plurality of electrode pairs spaced along the sensing region of the probe and electrically connected to the first conductor, wherein each electrode pair is positioned to shunt a portion of the resistance when in contact with a conductive fluid, and a circuit that measures the resistance of the first conductor to determine the fluid level.

In one embodiment, the system includes a variable speed drive powering a motor and an associated submersible pump with the motor speed varying in response to the resistance of the first conductor to control level of the fluid within a container, such as an oil well.

In one embodiment, the first conductor includes a plurality of discrete resistors connected in series and positioned at predetermined distances within the sensing region. Each electrode or contact pair has an associated resistor and shunts the associated resistor when in contact with a conductive fluid. Each resistor may include an associated switch and electrode pair, with the switch actuated by the fluid forming a conductive path between the associated electrode pair.

In one embodiment, a fluid level sensor includes a probe having a first insulated conductor having a plurality of discrete resistors connected in series and disposed at predetermined distances along the first conductor within a sensing region of the probe. Each of the plurality of resistors includes an associated normally-open switch configured to shunt current across the resistor when closed. Each of the plurality of resistors also includes an associated first conductive contact electrically connected to the first conductor.

The probe includes a second insulated conductor having a plurality of second conductive contacts with each of the second conductive contacts electrically connected to the second conductor and having a corresponding one of the first contacts. The second conductor is configured to provide power to corresponding active switches when a conductive path is formed by fluid in contact with corresponding first and second contacts resulting in actuation of the corresponding switch and shunting of the corresponding resistor. A resistance measuring device is connected to the first conductor to monitor change in resistance of the first conductor and serially connected, non-shunted resistors to determine fluid level. In one embodiment, a variable speed drive generates a varying output signal to control a submersible motor/pump in response to varying resistance of the first conductor. In one embodiment, the first and second conductors are implemented by a coaxial cable having a solid or stranded conductor separated by an insulating material from a solid and/or stranded/braided second conductor. The probe is covered by one or more insulating layers that may be selected based on the particular application environment.

In various embodiments the switches of the probe are active switches powered by voltage induced across the probe conductors by one or more current carrying conductors in proximity with the probe conductors but electrically isolated from the probe conductors. In one embodiment, one or more current carrying conductors power the submersible pump/motor and create an electromagnetic field that surrounds the probe conductors to create an induced voltage and power the probe switches. In various embodiments, the probe switches are implemented by solid state devices, such as transistors or thyristors, also referred to as silicon controlled rectifiers (SCRs). The activation of a particular switch in response to conductive fluid reaching corresponding switch input(s) adds or subtracts an associated discrete resistance (or impedance) value that can be measured or monitored to determine an associated fluid level within the container or well. In one embodiment, probe contacts are spaced substantially evenly along a length of the probe within a measurement region. For example, a probe may extend several hundred feet into a well bore with a measurement region or zone of 500 feet having contacts spaced about every 10 feet within the measurement region, which may be positioned at the distal end of the probe, for example.

Systems and methods according to various embodiments of the present disclosure provide various advantages. For example, fluid level sensing and control according to various embodiments of the present disclosure provide for more robust sensing of fluid levels in harsh environments, such as in an oil well application, for example. Various embodiments include a fluid level sensing probe that uses voltage induced in a second conductor by adjacent, electrically isolated current-carrying conductors to power and actuate corresponding switches to change the electrical characteristics of the probe.

A fluid level sensing probe according to various embodiments of the present disclosure may be deployed along with a submersible pump/motor to sense or measure discrete fluid levels within a designated range of the probe and communicate the fluid level to the surface. The sensing probe may be powered by voltage induced by the current-carrying conductors connected to the submersible pump/motor. Various embodiments employ active solid state switches within the probe powered by voltage induced by current flowing in one or more adjacent motor conductors to reliably operate at least as long as the associated submersible pump. In addition, use of multiple switching components along a length of the probe within the sensing range provides fault tolerance and allows continued operation of the pump with automatic level control if one or more switching components fail. Embodiments of a fluid level probe according to the present disclosure may be used to increase or decrease pump/motor speed to maintain a desired fluid level, such as used in hydrocarbon well pump-off control, for example. Similarly, the fluid level can be used to shut down a motor/pump to provide overheating protection for the motor.

The above advantages and various other advantages and features may be recognized by those of ordinary skill in the art based on the following detailed description when taken in conjunction with the accompanying drawings.

BRIEF DESCRIPTION OF THE DRAWINGS

FIG. 3 illustrates a representative embodiment with a fluid sensing probe implemented using a coaxial cable and discrete resistors in a system or method for fluid level sensing and control according to the present disclosure;

FIG. 4 illustrates placement of contact or electrode pairs at predetermined distances along a sensing region of a fluid level probe according to various embodiments of the present disclosure;

FIG. 5 is a simplified circuit schematic illustrating one embodiment of a switching device having a voltage regulator to selective switch an SCR controlled shunting circuit used to vary electrical characteristics of a fluid level probe according to the present disclosure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
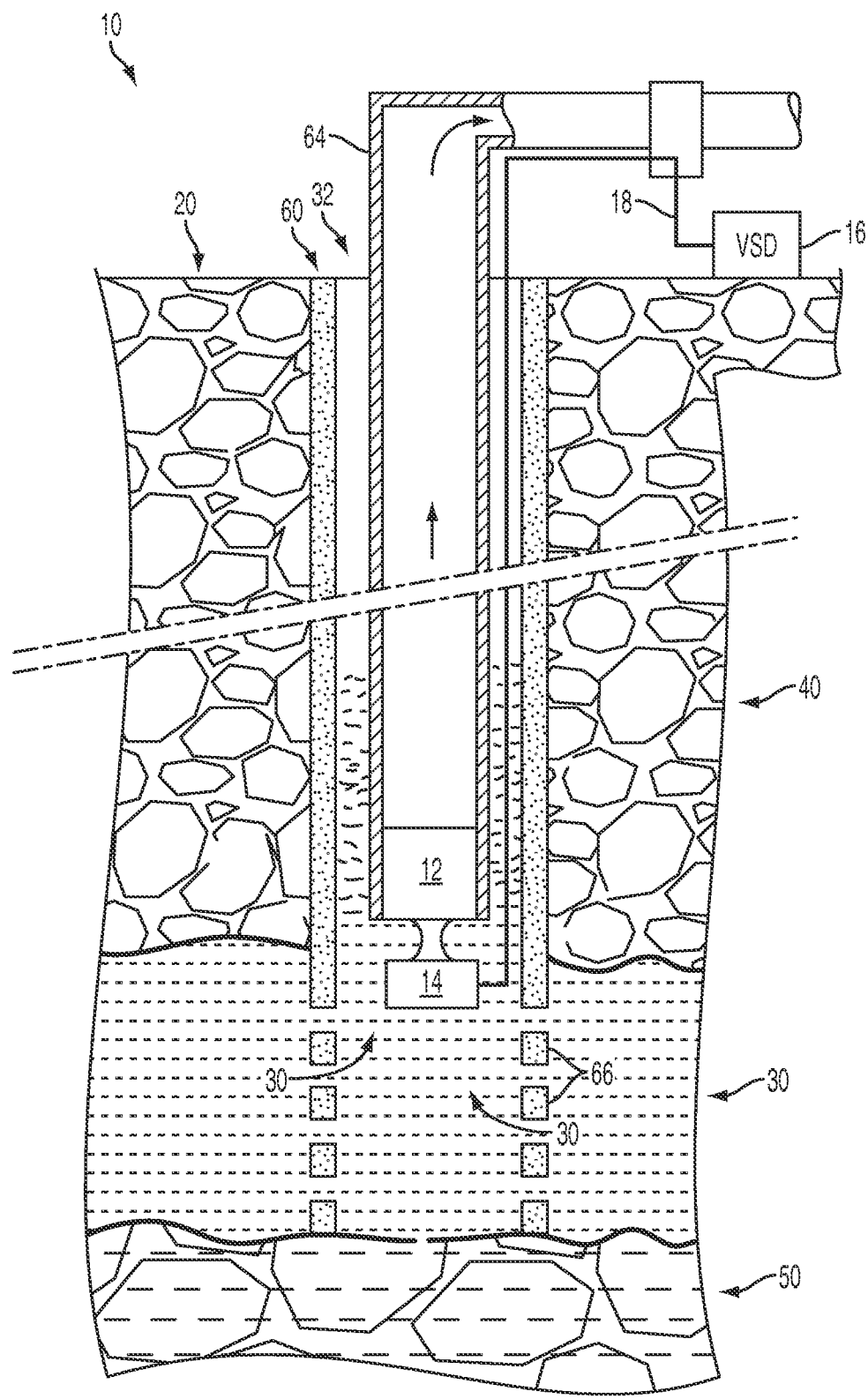
FIG. 1 is a diagram illustrating a representative oil well application for a system or method for fluid level sensing and control according to embodiments of the present disclosure.

FIG. 1 is a diagram illustrating a representative hydrocarbon well application for a system or method for fluid level sensing and control according to embodiments of the present disclosure. Those of ordinary skill in the art will understand that the representative system 10 may be used in various other applications where determining a fluid level may be desired. In the representative embodiment illustrated in FIG. 1, system 10 includes a submersible pump 12 having an impeller driven by an associated motor 14. A motor drive 16 provides power to motor 14 via a cable assembly 18 to control the motor speed and associated output of pump 12. Motor drive 16 may be implemented by a variable speed drive (VSD) to control the motor speed in response to an input, which may be provided by a fluid level probe within cable assembly 18, for example, as described in greater detail herein.

As illustrated and described in greater detail with reference to FIGS. 2-8, cable assembly 18 includes a probe with contact pairs exposed to fluid 30 within hydrocarbon or oil well 32. In the representative embodiment of FIG. 1, fluid 30 may be contained within a geologic formation between layers 40 and 50 and may include various hydrocarbons, such as oil and gas, in addition to water and sediment, and may be several hundred to several thousand meters below surface 20. In other applications, a submersible pump 12 and motor 14 may be used to pump fluid 30 from a naturally occurring or man-made container, tank, reservoir, etc.

During the production phase after drilling of the well and placement of bore casing 60 and positioning of conduit 64 with submersible pump 12 and motor 14, the level of fluid 30 within well 32 may be monitored and controlled within a range of about 100-200 m above and/or below the position of submersible pump 12. As such, various embodiments of a system and method for fluid level sensing according to the present disclosure may include contact pairs only within a measurement or sensing region, zone or range along the length of the probe to reduce associated costs and complexity of manufacturing the sensor probe. However, in other applications, the probe may include contact pairs spaced at predetermined intervals along substantially the entire length of the probe.

During operation, motor drive 16 controls speed of motor 14 and the impeller of pump 12 to pump fluid 30 entering through spaces or perforations 66 of bore casing 60 through conduit 64 to the surface 20. In embodiments having a motor drive 16 implemented by a VSD, motor speed may be controlled in response to a signal or electrical characteristic of a probe extending into fluid 30 to automatically control operation of motor 14 and pump 12.

Although depicted as a generally straight and vertical configuration, well 32 may include various sections or segments that extend generally diagonally and/or horizontally relative to surface 20. For wells that position pump 12 and motor 14 within a generally horizontal section of a geologic formation, various conventional types of pressure transducers may not provide an accurate indication of the fluid level within the well. In contrast, a fluid level sensor system and method according to embodiments of the present disclosure may be used in such applications to provide an accurate indication of the fluid position within the well.

Figure 2:
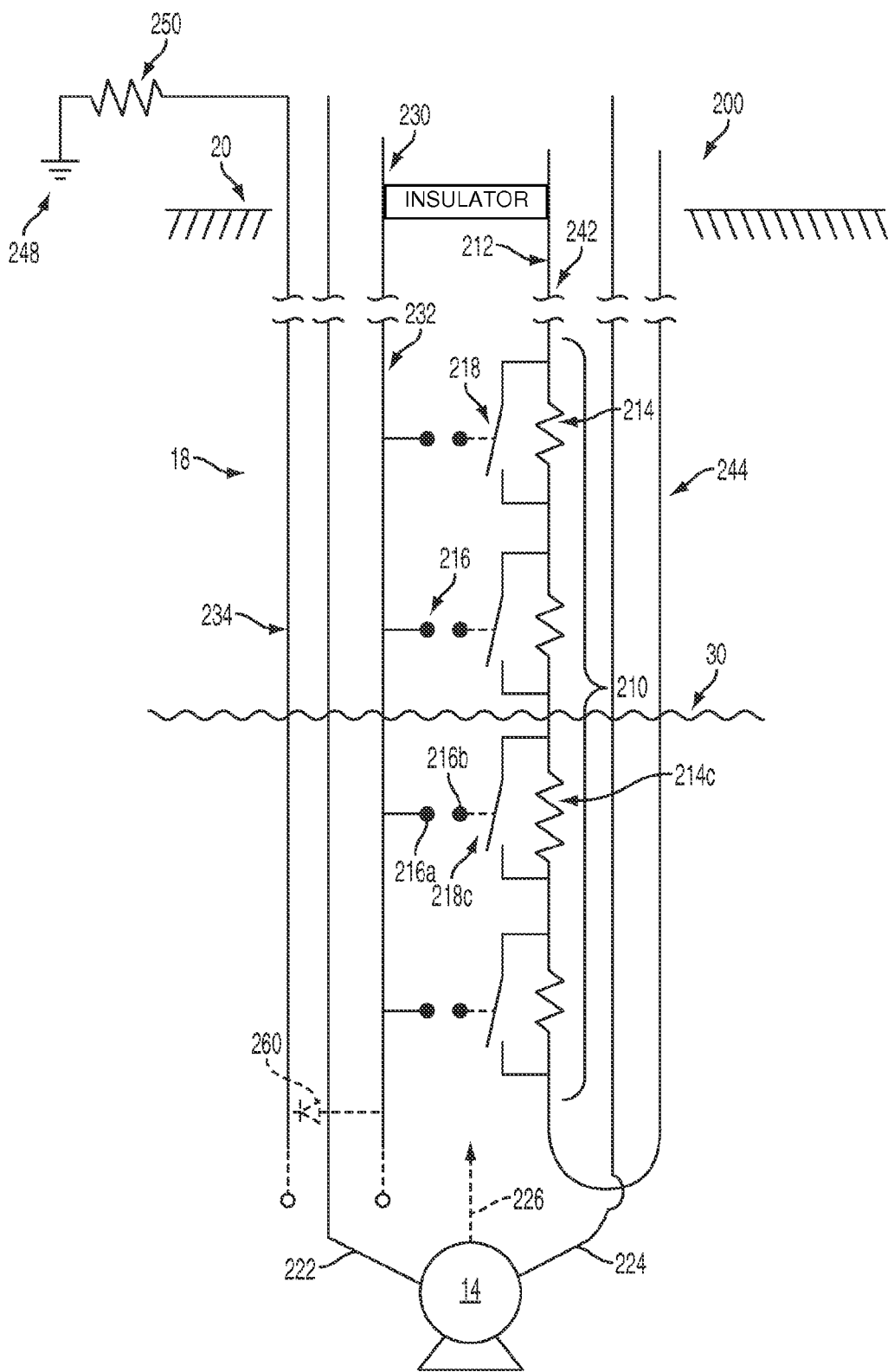
FIG. 2 is a simplified schematic circuit diagram illustrating construction and operation of a system or method for fluid level sensing and control according to one embodiment of the present disclosure.

FIG. 2 is a simplified schematic circuit diagram illustrating construction and operation of a system or method for fluid level sensing and control according to one embodiment of the present disclosure. As illustrated and described with reference to FIG. 1, a cable assembly 18 may include at least a portion of a fluid level sensor having a probe 200 with a measurement or sensing region or zone 210 that is positioned below ground surface 20 and at least partially submerged within fluid 30. Probe 200 includes a conductor 212 having a plurality of discrete resistive elements 214 connected in series and each having an associated contact pair 216 substantially evenly spaced along a length of probe 200. In one embodiment, sensing region or zone 210 extends about 500 ft (152.4 m) with contact pairs 216 substantially evenly spaced about every 10 ft (3.0 m). Each resistive element 214 has an associated switch 218 powered by an induced voltage or current generated by power provided to submersible pump motor 14 via associated motor conductors 222, 224. Depending on the particular application, motor 14 may be a two-phase motor having corresponding conductors 222, 224, or a three-phase motor with an additional conductor 226 extending to the motor drive 16 (FIG. 1) along with conductors 222, 224. Motor power conductors 222, 224 and/or 226 carry current to/from motor 14 and create an electromagnetic field surrounding the current carrying conductors during motor operation. Conductor 212 and conductor 230 are positioned within close proximity of current carrying conductors 222, 224, and/or 226 such that the electromagnetic field generated by the motor conductors generates a corresponding induced voltage in conductors 212 and 230 to power actuation or activation of switches 218.

In one embodiment, discrete resistive elements 214 are eliminated and/or replaced by a cable having a high impedance conductor or semi-conductive element at least throughout measurement or sensing region 210. In this embodiment, switches 218 shunt or short circuit across a length of the high impedance cable with a low impedance conductor to modify the resistance or impedance of the cable in discreet or step increments based on the number of switches 218 that are activated or actuated.

Probe conductor 212 may include a first segment or section 242 (which may be referred to as the supply segment or leg) and a second segment or section 244 (which may be referred to as the return segment or leg). Similarly, probe conductor 230 may include a first segment or section 232 (which may be referred to as the supply segment or leg) and a second segment or section 234 (which may be referred to as the return segment or leg). Return segment 234 may be connected to a common electrical ground 248 through one or more resistors 250. First segment 232 and second segment 234 may be optionally disconnected or open circuit near motor 14. In this case, the last switching device in series will not function. Alternatively, first segment 232 and second segment 234 may be connected together by a diode 260, which allows some current to flow to ground so that the last switching device will fire and release normally. Selection of an open circuit configuration or diode-connected shield or conductor configuration may depend on the particular application and implementation.

As generally illustrated in FIG. 2, fluid conducts across contacts 216a, 216b of a contact pair 216 to activate or actuate an associated switch 218c to shunt or short circuit the associated discrete resistive element 214c. In various embodiments, switches 218 may be implemented by devices that have a memory or latching action such that the switch activates when fluid 30 conducts across an associated contact pair, but does not require continued power or induced voltage at the trigger to maintain the switch state, whether activated or deactivated. While the representative embodiment illustrated includes switches 118 configured as normally open when fluid 30 does not conduct across corresponding contacts 216, those of ordinary skill in the art will recognize that probe 200 can be configured with normally closed switches. In one embodiment, switches 218 are implemented by solid state devices, which may include semiconductor devices, such as transistors or thyristors, which may also be referred to as silicon controlled rectifiers (SCRs), for example. As generally understood by those of ordinary skill in the art, a thyristor may be used in various modes of operation. In the normal deactivated or "off" state, the device does not conduct significant current, although some small leakage current may be present. To trigger or activate the device, a positive voltage bias is applied across the gate and cathode and the device conducts current. The device will remain latched in the conducting or activated state even if the gate current is removed if the current through the device from cathode to anode remains above a corresponding holding current. The device will switch to a deactivated or "off" state if the holding current falls below the corresponding threshold for some period of time and no current is applied to the gate by an associated gate-cathode biasing voltage.

As generally illustrated in FIG. 2, fluid conducts across contacts 216a, 216b of a contact pair 216 to activate or actuate an associated switch 218c to shunt or short circuit the associated discrete resistive element 214c. In various embodiments, switches 218 may be implemented by devices that have a memory or latching action such that the switch activates when fluid 30 conducts across an associated contact pair, but does not require continued power or induced voltage at the trigger to maintain the switch state, whether activated or deactivated. While the representative embodiment illustrated includes switches 218 configured as normally open when fluid 30 does not conduct across corresponding contacts 216, those of ordinary skill in the art will recognize that probe 200 can be configured with normally closed switches. In one embodiment, switches 218 are implemented by solid state devices, which may include semiconductor devices, such as transistors or thyristors, which may also be referred to as silicon controlled rectifiers (SCRs), for example. As generally understood by those of ordinary skill in the art, a thyristor may be used in various modes of operation. In the normal deactivated or "off" state, the device does not conduct significant current, although some small leakage current may be present. To trigger or activate the device, a positive voltage bias is applied across the gate and cathode and the device conducts current. The device will remain latched in the conducting or activated state even if the gate current is removed if the current through the device from cathode to anode remains above a corresponding holding current. The device will switch to a deactivated or "off" state if the holding current falls below the corresponding threshold for some period of time and no current is applied to the gate by an associated gate-cathode biasing voltage.

Probe 200 may be implemented by a coaxial cable having a conductive shield 230 separated by an insulator from a conductive core formed by conductor 212. The conductive core may include a first section 242 extending between a surface location and the submersible pump motor 14 and a second section 244 extending between the submersible pump motor 14 and the surface location. The conductive core of the first section 242 connects each of the plurality of resistive elements 214 in series. Conductive shield 230 may include an optional diode 260 between first section 232 and second section 234 to control direction of current flow to ground 248 as previously described. Resistor 250 may be implemented by a single power resistor, or by a bank of resistors connected in parallel and having similar or differing values to provide heat dissipation and/or fault tolerance for continued operation after failure of one or more resistors in the resistor bank.

In one embodiment, motor conductors 222, 224, (and 226 if present for a three-phase motor), as well as first section 242 and second section 244 of conductor 212 are connected to a variable speed drive 16 (VSD, FIG. 1) disposed above ground surface 20. An electrical property or characteristic of probe 200 may then be used to control the motor speed of submersible pump motor 14 and the associated pump to control the level of fluid 30 within a well, tank, reservoir, etc. In the representative embodiment illustrated in FIG. 2, the electrical property or characteristic corresponds to the resistance measured across the supply and return segments of conductor 212. Voltage or current could also be used depending on the particular application and implementation of probe 200.

As illustrated in FIGS. 1-2, in one embodiment, the resistance conductor segments 242, 244 may be connected to a variable speed drive (VSD) 16 above the surface 20 of the well 32. The desired fluid level within the well can be established manually or based on a measured value of the resistance across the first and second segments 242, 244, and used to determine a target level or motor speed for submersible pump motor 14. The VSD 16 increases the motor speed as resistance across segments 242, 244 decreases indicating a higher fluid level, and decreases the motor speed as resistance across segments 242, 244 increases indicating a lower fluid level. Those of ordinary skill in the art will recognize that this implementation may be reversed by switching the connections for the supply segment 242 and return segment 244 to the VSD 16 such that the resistance increases as the fluid level rises. Alternatively, probe 200 may be configured with normally closed switches that result in lower resistance readings for lower fluid levels and higher resistance readings as discrete resistive elements are switched into the circuit in response to the fluid level rising and conducting across associated contact pairs 216 as previously described.

Depending on the particular configuration, some of the switching devices 218 may become redundant, i.e. not significantly affect the resistance measurement whether activated or deactivated. For example, some resistance will be added for each switching device. For implementations using SCRs, about two ohms is associated with each SCR. If resistance is being decreased as fluid level rises, the resistance measurement may reach zero before all the SCRs are fired or triggered such than any subsequent SCRs (or other switch implementations) do not affect the resistance measurement. The supply and return sections can be reversed/switched to address this situation such that resistance increases as fluid level rises.

FIG. 3 illustrates a representative embodiment with a fluid sensing probe 200 implemented using a coaxial cable 202 and discrete resistors 214 in a system or method for fluid level sensing and control according to the present disclosure. Like reference numerals are used to refer to elements or components with similar functions as previously described. In the embodiment of FIG. 3, coaxial cable 202 is shown in partial cutaway to reveal various internal components. Coaxial cable 202 includes an outer covering or sheath 258 that may be made of a non-reactive material selected based on the intended application. For hydrocarbon well applications, external covering, coating, or sheath 258 may be a vulcanized coating, for example. A conductive shield 230 is wrapped around the circumference of the cable and may be a braided wire of various types of conductors and/or alloys including aluminum, copper, silver, or gold, for example. Conductive shield 230 may include multiple braided layers of conductive material and/or a thin conductive foil, for example.

Coaxial cable 202 is particularly well-suited for a fluid level sensor probe powered by induced voltage/current according to embodiments of the present disclosure. Conductive shield 230 acts as an antenna to harness the power of the electromagnetic field generated by adjacent electrically isolated current carrying conductors, such as the submersible pump motor conductors proximate or adjacent to coaxial cable 202, for example. Coaxial cable 202 also includes a low impedance center or core conductor 242, 244, separated from conductive shield 230 by an insulating material 256. The low impedance center conductor 242,244 does not significantly increase the resistance as seen at the surface motor controller relative to the resistive elements 214 that are selectively connected in series, or removed by selective shunting or short circuiting by associated switching devices 218 when fluid conducts across associated contacts 216. First and second segments or sections 232, 234 of conductive shield 230 may be optionally connected by a diode 260 to control direction of induced current flow as previously described.

FIG. 4 illustrates placement of contact or electrode pairs 216 at predetermined distances 270 along a sensing region 210 of a fluid level probe 200 according to various embodiments of the present disclosure. In the embodiment of FIG. 4, contact pairs 216 are implemented by a first contact 216a, which is made of electrically conductive material and exposed to the surface of probe 200 for contacting fluid within a container or well. First contact 216a extends through vulcanized coating or sheath 258 and is surrounded by an associated second contact 216b that extends through vulcanized coating or sheath 258 and is implemented by a conductive ring that surrounds contact 216a in this embodiment. Contacts 216a and 216b are separated by an insulating epoxy sealant, generally indicated by reference numeral 254. Contact pairs 216 are generally equally spaced at a predetermined distance 270, which may vary based on the particular application and implementation. Similarly, the particular geometry, configuration, and spacing of contacts 216a and 216b within a contact pair may vary by application and implementation. Contact spacing may be selected based on the characteristics of the fluid being sensed with larger spacing provided for more viscous fluids that may tend to leave a residue that may conduct between the contacts after the fluid level has dropped below the contacts.

FIG. 5 is a simplified circuit schematic illustrating one embodiment of a switching device, such as switching device 218, having a voltage regulator to selectively switch an SCR controlled shunting circuit used to vary electrical characteristics of a fluid level probe according to the present disclosure. The representative switching device or switch 218 illustrated in the embodiment of FIG. 5 using a silicon controlled rectifier (SCR) 500, which is a semi-conductor solid state device, to selectively switch resistor 214 into or out of series with conductor 242 in response to fluid conducting across associated contacts or electrodes 216a connected to conductor 232, and 216b indirectly connected to conductor 242 through diode 550.

SCR 500 has a cathode (K) connected to conductor 244, an anode (A) connected to conductor 242, and a gate (G) connected to conductor 232 through resistor 520 and varistor 510, which is implemented by a metal oxide varistor in this embodiment. A zener diode 530 is connected to between gate (G) of SCR 500 and conductor 234 through a diode 540. Varistor 510, resistor 520, zener diode 530, and diode 540 function as a simple regulated voltage supply to selectively power gate (G) of SCR 500 using voltage/current induced by at least one current carrying conductor proximate probe 200.

Switching device 218 is encapsulated or waterproofed such that only contacts 216a, 216b will be exposed to the fluid within the container or well, as generally illustrated in FIG. 4. All components of switching d are sized based on the particular application and anticipated induced voltage/current. The components should be selected with sufficient power ratings or wattage to be compatible with the induced voltage/current. Varistor 510 should be rated at a voltage that is lower than the lowest voltage rating of any submersible pump motor within the particular application. For example, in a representative oil well application, a 635V varistor 510 would be sufficient for many applications as representative submersible pump motors range from 800V-3500V, for example. Varistor 510 provides a consistent voltage for the voltage regulator implemented by resistor 520 and zener diode 530. Those of ordinary skill in the art will recognize that varistor 510 may be omitted in applications where the induced voltage/current characteristics facilitate sizing and packaging of the resistor 520 and zener diode 530 within the probe. For example, the power supply may be implemented by a resistor 520 and zener diode 530 without a varistor in submersible pump/motor applications where the pump/motor current is consistent and low enough to size the resistor 520 and zener diode 530 practically, i.e. small enough to be implemented inside of the probe.

In the representative embodiment of FIG. 5, varistor 510, resistor 520, zener diode 530, and diode 540 are selected to provide a regulated voltage of between about 2V-7V that is applied to gate (G) of SCR 500 at all times that induced voltage is present. In an alternative configuration, the voltage to gate (G) of SCR 500 can be switched through contacts 216a and 216b to apply voltage to anode (A) whenever induced voltage is present. SCR 500 will fire correctly in this configuration although the current of induced voltage in the resistance conductor 242 may not be sufficient to seal or latch SCR 500 in the closed position, i.e. may not exceed the holding current of SCR 500. If SCR 500 does not latch, this may result in an inaccurate reading as the fluid level decreases. As such, the configuration illustrated in the schematic of FIG. 5 is more suitable for most applications.

Diode 540 is provided to ensure voltage on conductor 234 does not back feed the gate (G) of SCR 500. Otherwise, SCR 500 may not fire correctly if the voltage from the gate (G) to the anode (A) is biased the wrong way. Likewise, desired operation of SCR 500 also requires a proper bias across cathode (K) and anode (A). Diode 550 is connected between contact 216b and anode (A) of SCR 500 to provide a suitable voltage bias. Diode 550 should be selected so that it is rated to be compatible with the induced voltage of conductor 232 (S1). Conductor 242 is connected to anode (A) before resistor 214 and between SCR 500 and diode 550. Cathode (K) is connected to conductor 244 (R2) to place SCR 500 in parallel with conductors 242 (R1) and 244 (R2). When SCR 500 fires, resistor 214 will be bypassed (shunted) or will be reflected in the resistance circuit depending on the polarity of conductors 242 and 244 with respect to their connection to the submersible pump motor drive as previously described.

Figure 6:
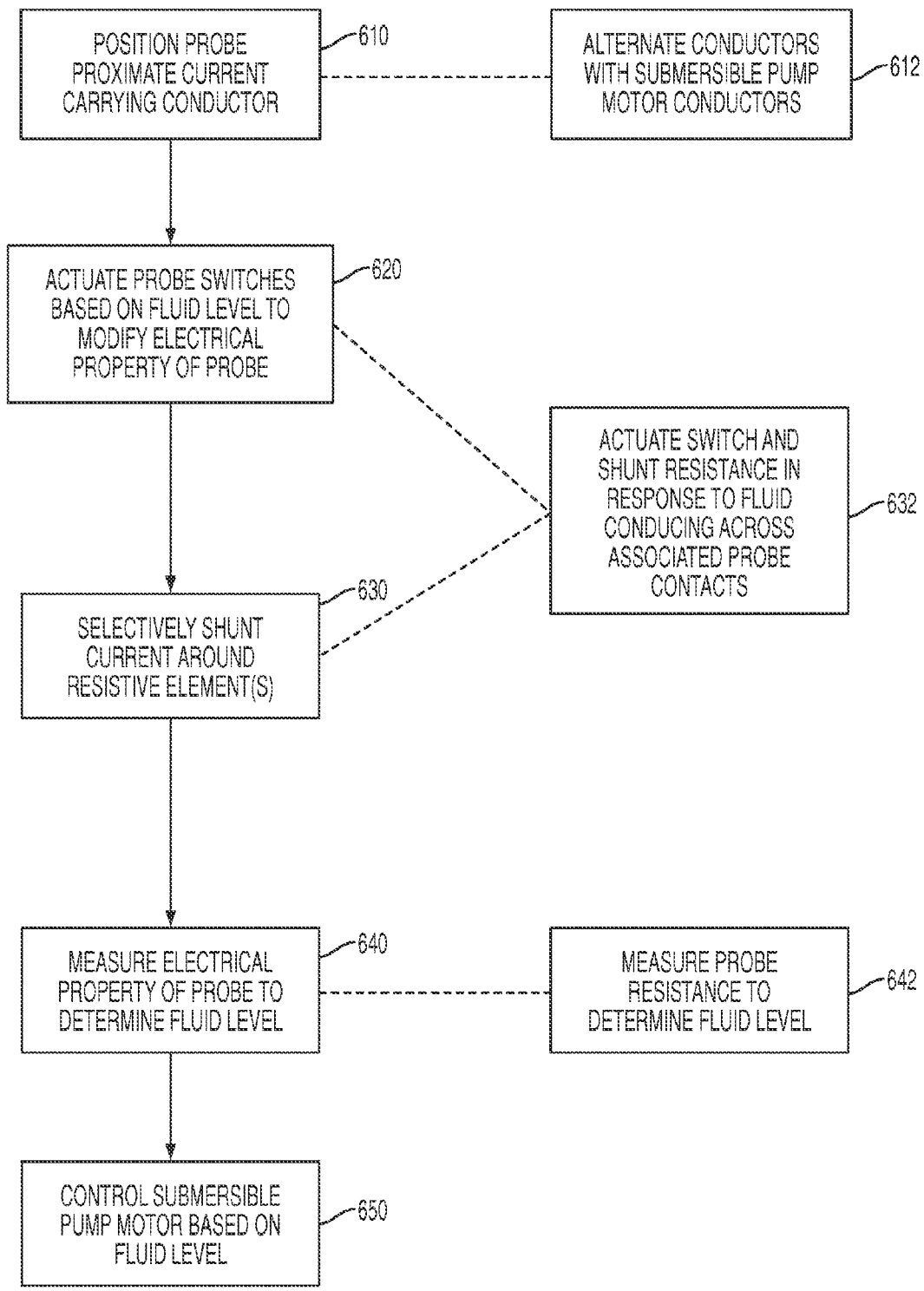
FIG. 6 is a block diagram/flowchart illustrating operation of a system or method for fluid level sensing and control according to various embodiments of the present disclosure.

FIG. 6 is a block diagram/flowchart illustrating operation of a system or method for fluid level sensing and control according to various embodiments of the present disclosure. Those of ordinary skill in the art will recognize that the steps or functions illustrated in FIG. 6 may be implemented by one or more electric/electronic components that may be implemented by discrete components and/or integrated circuits. Various functions may also be implemented by a microprocessor or microcontroller implementing a control strategy to control an electric machine operating as a motor. The order or sequence of steps or functions illustrated is not necessarily important or desired. Some functions may be performed in a different order, may be repeatedly performed, or may be omitted while still providing various features of a system or method for fluid level sensing or control according to the present disclosure. Similarly, functions illustrated separately may be combined or performed by a single circuit or element in some implementations.

Operation of a system or method for sensing level of a fluid according to the representative embodiment illustrated in FIG. 6 may include positioning a probe within proximity of at least one current carrying conductor as represented by block 610. The probe may include one or more conductors positioned in a generally alternating fashion with one or more electrically isolated current carrying conductors used to provide power from an above-ground variable speed motor drive to a submersible pump motor within a container or well as generally represented by block 612. The system or method may also include actuating switches within the sensor probe powered by induced voltage from at least one proximate current carrying conductor in response to the level of the fluid as represented by block 620. Actuation of the switches may selectively shunt current around resistive elements positioned substantially evenly spaced along a sensing region of the fluid probe as represented by block 630. In one embodiment, each of the switches is associated with a resistive element and selectively shunting current comprises actuating an associated switch in response to the fluid creating a conductive path between an associated pair of contacts of the probe as represented at 632. The system or method may also include measuring an electrical property of the fluid level probe to determine the level of the fluid as represented by block 640. In one embodiment, the switches comprise silicon controlled rectifiers and measuring comprises determining resistance of the fluid level probe as represented by block 642. The system or method may also include controlling a submersible pump motor in response to resistance of the fluid level probe as represented by block 650.

As demonstrated by the representative embodiments described with respect to FIGS. 1-6, systems and methods for fluid level sensing and control according to the present disclosure provide various advantages. For example, fluid level sensing and control according to various embodiments of the present disclosure provide for more robust sensing of fluid levels in harsh environments, such as in an oil well application, for example. Use of induced voltage to power a fluid level sensing probe from adjacent, electrically isolated current-carrying conductors to power and actuate corresponding switches to change the electrical characteristics of the probe harnesses the otherwise troublesome electromagnetic field created by the motor conductors and does not require a separate power supply.

A fluid level sensing probe according to various embodiments of the present disclosure may be deployed along with a submersible pump/motor to sense or measure discrete fluid levels within a designated range of the probe and communicate the fluid level to the surface. The sensing probe may be powered by voltage induced by the current-carrying conductors connected to the submersible pump/motor. Various embodiments employ active solid state switches within the probe powered by voltage induced by current flowing in one or more adjacent motor conductors to reliably operate at least as long as the associated submersible pump. In addition, use of multiple switching components along a length of the probe within the sensing range provides fault tolerance and allows continued operation of the pump with automatic level control if one or more switching components fail. Embodiments of a fluid level probe according to the present disclosure may be used to increase or decrease pump/motor speed to maintain a desired fluid level, such as used in hydrocarbon well pump-off control, for example. Similarly, the fluid level can be used to shut down a motor/pump to provide overheating protection for the motor While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A system for sensing a level of a fluid, comprising:
    a submersible pump having an impeller driven by an associated motor;
    a fluid level sensor having a probe with a plurality of discrete resistive elements each having an associated contact pair substantially evenly spaced along a length of the probe wherein each contact pair comprises a first conductive contact and a second conductive contact surrounding at least a portion of the first conductive contact and an associated switch powered by an induced voltage or current generated by power provided to the submersible pump motor and activated by the fluid conducting across the contact pair to shunt the associated discrete resistive element.

2. The system of claim 1 wherein at least one of the associated switches comprises a semiconductor switch.

3. The system of claim 2 wherein the semiconductor switch comprises a silicon controlled rectifier (SCR).

4. The system of claim 1 wherein at least one of the associated switches comprises a solid state device.

5. The system of claim 1 wherein the fluid level sensor is configured to determine the level of the fluid based on resistance of the probe.

6. The system of claim 1 further comprising a variable speed drive coupled to the submersible pump motor and the fluid level sensor, the variable speed drive controlling speed of the motor in response to an electrical property of the probe.

7. The system of claim 6 wherein the electrical property comprises resistance.

8. A system for sensing a level of a fluid, comprising:
    a fluid level sensor comprising:
    a probe comprising a plurality of discrete resistive elements each having an associated contact pair spaced along a length of the probe;
    a switch associated with each contact pair actuated by the fluid conducting across the contact pair;
    wherein the probe further comprises: a conductive shield separated by an insulator from a conductive core and including a first section extending between a surface location and a fluid level monitoring depth and a second section extending between the fluid level monitoring depth and the surface location, the conductive core of the first section connecting each of the plurality of discrete resistive elements in series;

a voltage regulator associated with each switch and connected across the conductive shield of the first section and the conductive shield of the second section;

wherein each switch is implemented by a silicon controlled rectifier having a gate connected to the associated voltage regulator, an anode connected to the conductive core of the first section, and a cathode connected to the conductive core of the second section, and wherein a first member of each contact pair is connected to the conductive shield of the first section and a second member of each contact pair is connected to the conductive shield of the second section.

9. The system of claim 8 wherein the voltage regulator comprises a resistor connected in series with a zener diode across the conductive shield of the first and second sections.

10. The system of claim 9 further comprising a varistor connected between the resistor and the conductive shield of the first section.

11. The system of claim 8 further comprising a diode connecting the conductive shield of the first section to the conductive shield of the second section.

12. The system of claim 8 further comprising a resistor connecting the conductive shield of the second section to ground.

13. A method for sensing level of a fluid, comprising:
powering switches by induced voltage from at least one proximate electrically isolated current carrying conductor that powers a submersible pump motor in a downhole;
actuating the switches in response to the level of the fluid to selectively shunt current around resistive elements positioned substantially evenly spaced along a sensing region of a fluid level probe, each of the resistive elements associated with a contact pair having a first conductive contact and a second conductive contact at least partially surrounding the first conductive contact; and
measuring an electrical property of the fluid level probe to determine the level of the fluid.

14. The method of claim 13 wherein the switches comprise thyristors.

15. The method of claim 13 wherein measuring comprises determining resistance of the fluid level probe.

16. The method of claim 13 wherein each of the switches is associated with a resistive element and wherein selectively shunting current comprises actuating an associated switch in response to the fluid creating a conductive path between an associated pair of contacts of the probe.

17. The method of claim 13 further comprising controlling a submersible pump motor in response to resistance of the fluid level probe.

18. A system for sensing fluid level associated with a submersible pump driven by an associated motor, comprising:
a fluid level sensor having a probe with a plurality of contact pairs spaced along a length of the probe, wherein each contact pair comprises a first conductive contact and a second conductive contact at least partially surrounding the first conductive contact, each contact pair having an associated switch powered by an induced voltage generated by at least one electrically isolated proximate current carrying conductor, each switch actuated when the fluid conducts across the associated contact pair to shunt an associated resistance of the probe.

19. A system for sensing fluid level associated with a submersible pump driven by an associated motor, comprising:
a fluid level sensor having a probe with a plurality of contact pairs spaced along a length of the probe each having an associated switch powered by an induced voltage generated by at least one electrically isolated proximate current carrying conductor, each switch actuated when the fluid conducts across the associated contact pair to shunt an associated resistance of the probe, wherein the probe comprises a coaxial cable with a first member of each contact pair associated with a conductive shield of the coaxial cable and a second member of each contact pair associated with a conductive core of the coaxial cable.

20. The system of claim 19 further comprising a voltage regulator associated with each switch and connected across the conductive shield and the conductive core of the coaxial cable.

21. The system of claim 20 wherein the voltage regulator comprises a zener diode.

* * * * *